(12) United States Patent
Marshall

(10) Patent No.: US 9,264,525 B1
(45) Date of Patent: Feb. 16, 2016

(54) TELEPHONE MOUTHPIECE SHIELD ASSEMBLY

(71) Applicant: Leo Marshall, Aurora, CO (US)

(72) Inventor: Leo Marshall, Aurora, CO (US)

( * ) Notice: Subject to any disclaimer, the term of this patent is extended or adjusted under 35 U.S.C. 154(b) by 0 days.

(21) Appl. No.: 14/560,152

(22) Filed: Dec. 4, 2014

(51) Int. Cl.
*H04M 1/00* (2006.01)
*H04M 1/03* (2006.01)

(52) U.S. Cl.
CPC ........................... *H04M 1/035* (2013.01)

(58) Field of Classification Search
CPC ................................ H04M 1/035; H04M 1/03
USPC ..................... 379/441, 447, 451; 455/575.6
See application file for complete search history.

(56) References Cited

U.S. PATENT DOCUMENTS

| | | | |
|---|---|---|---|
| 1,563,586 A | 12/1925 | Pierman et al. | |
| 2,078,877 A * | 4/1937 | Hoyland | 379/447 |
| 2,225,509 A | 12/1940 | Schober | |
| 2,245,724 A | 6/1941 | Scher | |
| 3,796,842 A | 3/1974 | Guille | |
| 4,483,414 A | 11/1984 | Tanaka | |
| 5,564,085 A * | 10/1996 | Chen et al. | 455/117 |
| 5,819,162 A | 10/1998 | Spann | |
| D427,986 S | 7/2000 | Webb et al. | |
| 6,510,311 B1 * | 1/2003 | Stitt | 455/90.3 |
| 7,515,708 B1 | 4/2009 | Doty, III et al. | |
| 7,532,719 B2 * | 5/2009 | Snodgrass | 379/441 |
| 7,613,224 B2 * | 11/2009 | Hammes et al. | 375/133 |
| 7,664,255 B2 * | 2/2010 | Amron | 379/420.04 |

* cited by examiner

*Primary Examiner* — Tuan D Nguyen

(57) ABSTRACT

A telephone mouthpiece shield assembly for includes a telephone receiver that has a mouthpiece, an earpiece and a body extending therebetween. The telephone receiver has a front side, a rear side, a first lateral side and a second lateral side. A mount is positioned on the telephone receiver. The mount is positioned between the mouthpiece and the earpiece. A shield comprises a plate that has an inner side and an outer side. The inner side abuts and is coupled to the mount such that the inner side faces the first lateral side of the telephone receiver. The plate includes a first section and a second section. The first section comprises a leg that is attached to and extending downwardly from the mount. The second section comprises a foot extending forwardly from a forward edge of the plate. The second section is positioned adjacent to the mouthpiece. The second section extends forward of the telephone receiver to shield the mouthpiece from ambient sound. The second section extends through a plane of an outer surface of the body extending around the telephone receiver.

7 Claims, 2 Drawing Sheets the principles and concepts of an embodiment of the disclosure and generally designated by the reference numeral 10 will be described.

TELEPHONE MOUTHPIECE SHIELD ASSEMBLY

BACKGROUND OF THE DISCLOSURE

Field of the Disclosure

The disclosure relates to shield devices and more particularly pertains to a new shield device for shielding a telephone mouthpiece from ambient noise.

SUMMARY OF THE DISCLOSURE

An embodiment of the disclosure meets the needs presented above by generally comprising a telephone receiver that has a mouthpiece, an earpiece and a body extending therebetween. The telephone receiver has a front side, a rear side, a first lateral side and a second lateral side. A mount is positioned on the telephone receiver. The mount is positioned between the mouthpiece and the earpiece. A shield comprises a plate that has an inner side and an outer side. The inner side abuts and is coupled to the mount such that the inner side faces the first lateral side of the telephone receiver. The plate includes a first section and a second section. The first section comprises a leg that is attached to and extending downwardly from the mount. The second section comprises a foot extending forwardly from a forward edge of the plate. The second section is positioned adjacent to the mouthpiece. The second section extends forward of the telephone receiver to shield the mouthpiece from ambient sound. The second section extends through a plane of an outer surface of the body extending around the telephone receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
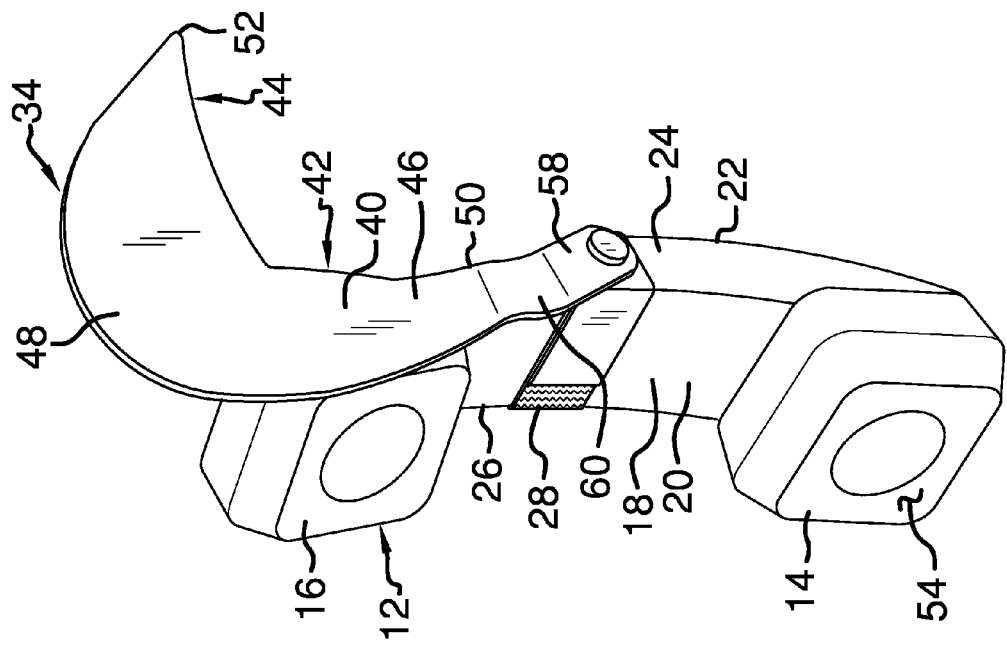
FIG. 1 is a front perspective view of a telephone mouthpiece shield assembly according to an embodiment of the disclosure.
Figure 2:
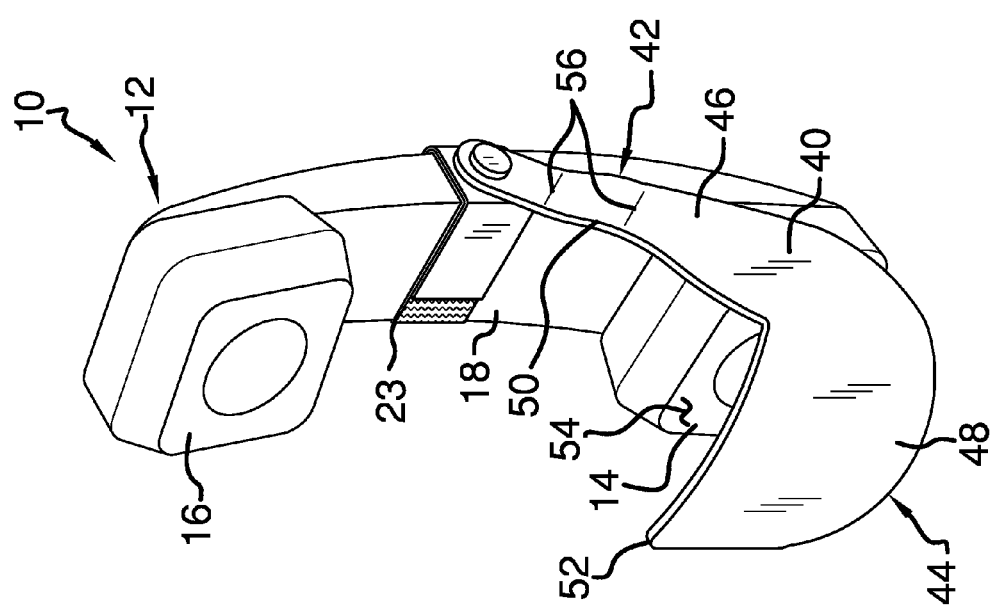
FIG. 2 is a perspective view of an embodiment of the disclosure.
Figure 4:
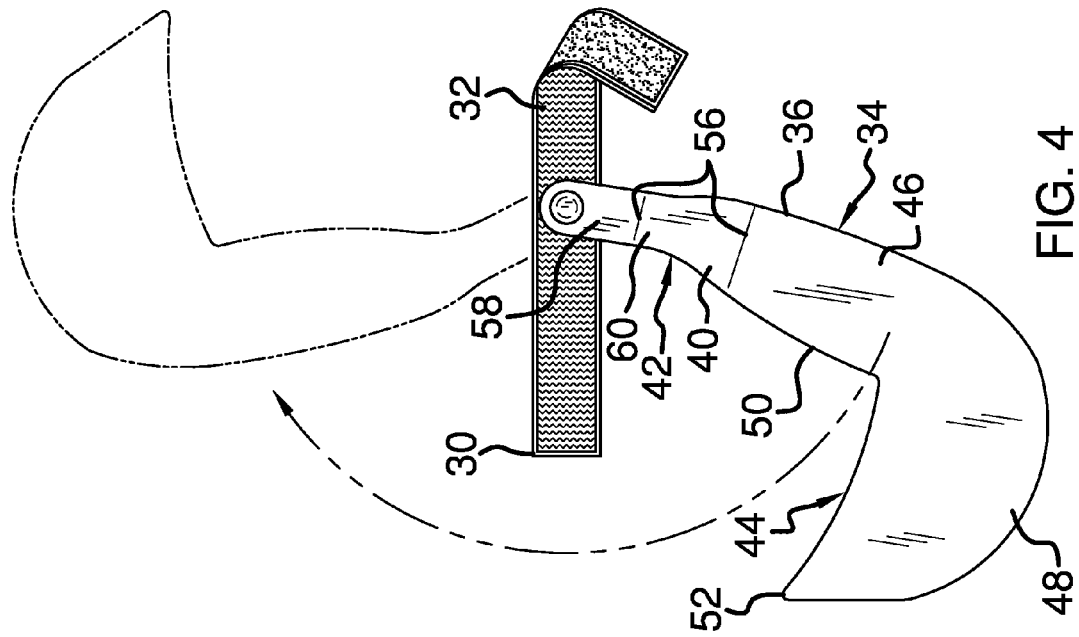
FIG. 4 is a left side view of an embodiment of the disclosure.
Figure 3:
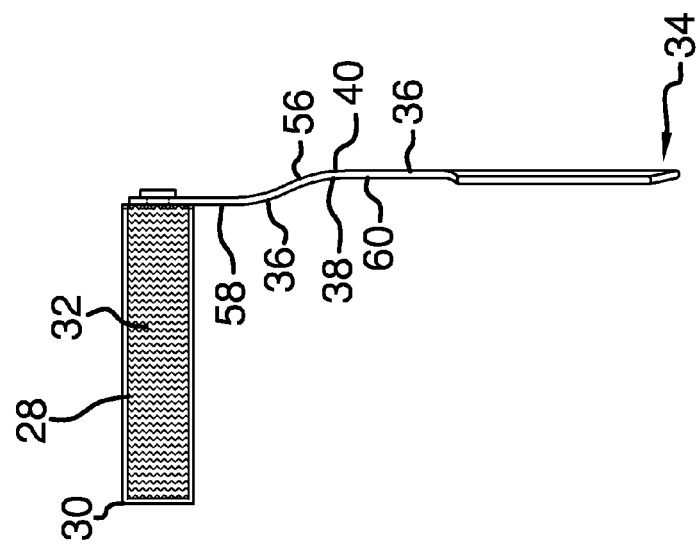
FIG. 3 is a front view of an embodiment of the disclosure.

With reference now to the drawings, and in particular to FIGS. 1 through 4 thereof, a new shield device embodying the principles and concepts of an embodiment of the disclosure and generally designated by the reference numeral 10 will be described.

As best illustrated in FIGS. 1 through 4, the telephone mouthpiece shield assembly 10 generally comprises a telephone receiver 12. The telephone receiver 12 includes a mouthpiece 14, an earpiece 16 and a body 18. The telephone receiver 12 has a front side 20, a rear side 22, a first lateral side 24 and a second lateral side 26. The telephone receiver 12 may be an analog telephone receiver of any conventional design.

A mount 28 is positioned on the telephone receiver 12. The mount 28 is positioned between the mouthpiece 14 and the earpiece 16. The mount 28 is removably attached to the telephone receiver 12. The mount 28 comprises a strap 30 extending around the body 18. The strap 30 has closure 32 thereon to releasably form the strap 30 into a closed loop. The closure 32 comprises a hook and loop closure facilitating selectively adjustment of a diameter of the closed loop.

A shield 34 is provided. The shield 34 comprises a plate 36 that has an inner side 38 and an outer side 40. The inner side 38 abuts and is coupled to the mount 28 such that the inner side 38 faces the first lateral side 24 of the telephone receiver 12. The plate 36 includes a first section 42 and a second section 44.

The first section 42 comprises a leg 46 that is attached to and extends downwardly from the mount 28. The second section 44 comprises a foot 48 extending forwardly from a forward edge 50 of the plate 36. The second section 44 has a distal end 52 with respect to the first section 42. The second section 44 tapers to a point at the distal end 52, giving the second section 44 a tear drop shape. The second section 44 is positioned adjacent to the mouthpiece 14. The second section 44 extends forward of the telephone receiver 12 to shield the mouthpiece 14 from ambient sound. The second section 44 extends through a plane of an outer surface 54 of the mouthpiece 14 of the telephone receiver 12.

The first section 42 is pivotally coupled to the mount 28 to selectively move the second section 44 away from the mouthpiece 14. The first section 42 has a pair of bends 56 to define a first portion 58 and a second portion 60 of the first section 42. The first portion 58 is coupled to the mount 28 and the second portion 60 is attached to the second section 44. The first 58 and second 60 portions are oriented parallel to each other and are laterally displaced from each other. The second portion 60 and the second section 44 are further laterally spaced from the telephone receiver 12 than the first portion 58.

In use, the shield 34 is positionable so the second section 44 is positioned adjacent to the mouthpiece 14. The second section 44 shields the mouthpiece 14 from ambient noise. The shield 34 is positionable so the second section 44 is positioned adjacent to the earpiece 16. The second section 44 no longer shields the mouthpiece 14 from ambient noise.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A telephone mouthpiece shield assembly configured to be coupled to a telephone receiver, said assembly comprising:
    a telephone receiver having a mouthpiece, an earpiece, and a body extending therebetween, said telephone receiver having a front side, a rear side, a first lateral side and a second lateral side;
    a mount being positioned on said telephone receiver, said mount being positioned between said mouthpiece and said earpiece; and
    a shield comprising a plate having an inner side and an outer side, said inner side abutting and being coupled to said mount such that said inner side faces said first lateral side of said telephone receiver, said plate including a first section and a second section, said first section comprising a leg being attached to and extending downwardly from said mount, said second section comprising a foot extending forwardly from a forward edge of said plate, said second section being positioned adjacent to said mouthpiece, said second section extending forward of said telephone receiver to shield said mouthpiece from ambient sound, said second section extending through a plane of an outer surface of said body extending around said telephone receiver.

2. The telephone mouthpiece shield assembly according to claim 1, wherein said mount is removably attached to said telephone receiver.

3. The telephone mouthpiece shield assembly according to claim 2, wherein said mount comprises a strap extending around said body, said strap having closure thereon to releasably form said strap into a closed loop.

4. The telephone mouthpiece shield assembly according to claim 3, wherein said closure comprises a hook and loop closure facilitating selectively adjustment of a diameter of said closed loop.

5. The telephone mouthpiece shield assembly according to claim 1, wherein said first section is pivotally coupled to said mount to selectively move said second section away from said mouthpiece.

6. The telephone mouthpiece shield assembly according to claim 1, wherein said first section has a pair of bends therein such that a first portion and a second portion of said first section are defined, first portion being coupled to said mount and said second portion being attached to said second section, said first and second portions being oriented parallel to each other and being laterally displaced from each other such that said second portion and said second section are further laterally spaced from said telephone receiver than said first portion.

7. A telephone mouthpiece shield assembly configured to be coupled to a telephone receiver, said assembly comprising:
    a telephone receiver having a mouthpiece, an earpiece, and a body extending therebetween, said telephone receiver having a front side, a rear side, a first lateral side and a second lateral side;
    a mount being positioned on said telephone receiver, said mount being positioned between said mouthpiece and said earpiece, said mount being removably attached to said telephone receiver, said mount comprising a strap extending around said body, said strap having closure thereon to releasably form said strap into a closed loop, said closure comprising a hook and loop closure facilitating selectively adjustment of a diameter of said closed loop; and
    a shield comprising a plate having an inner side and an outer side, said inner side abutting and being coupled to said mount such that said inner side faces said first lateral side of said telephone receiver, said plate including a first section and a second section, said first section comprising a leg being attached to and extending downwardly from said mount, said second section comprising a foot extending forwardly from a forward edge of said plate, said second section being positioned adjacent to said mouthpiece, said second section extending forward of said telephone receiver to shield said mouthpiece from ambient sound, said second section extending through a plane of an outer surface of said body extending around said telephone receiver, said first section being pivotally coupled to said mount to selectively move said second section away from said mouthpiece, said first section having a pair of bends therein such that a first portion and a second portion of said first section are defined, first portion being coupled to said mount and said second portion being attached to said second section, said first and second portions being oriented parallel to each other and being laterally displaced from each other such that said second portion and said second section are further laterally spaced from said telephone receiver than said first portion.

\* \* \* \* \*